O. F. SMITH.
SEEDING MACHINE.
APPLICATION FILED OCT. 15, 1915.
1,212,414.
Patented Jan. 16, 1917.
2 SHEETS—SHEET 1.
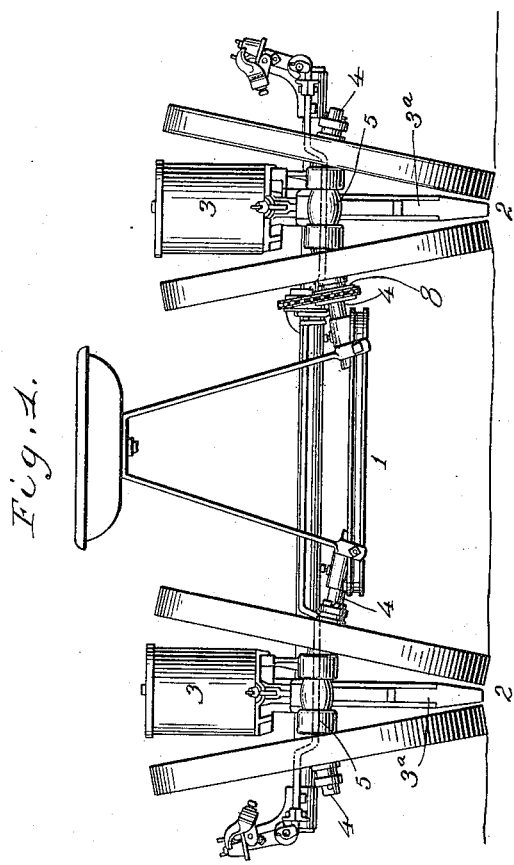

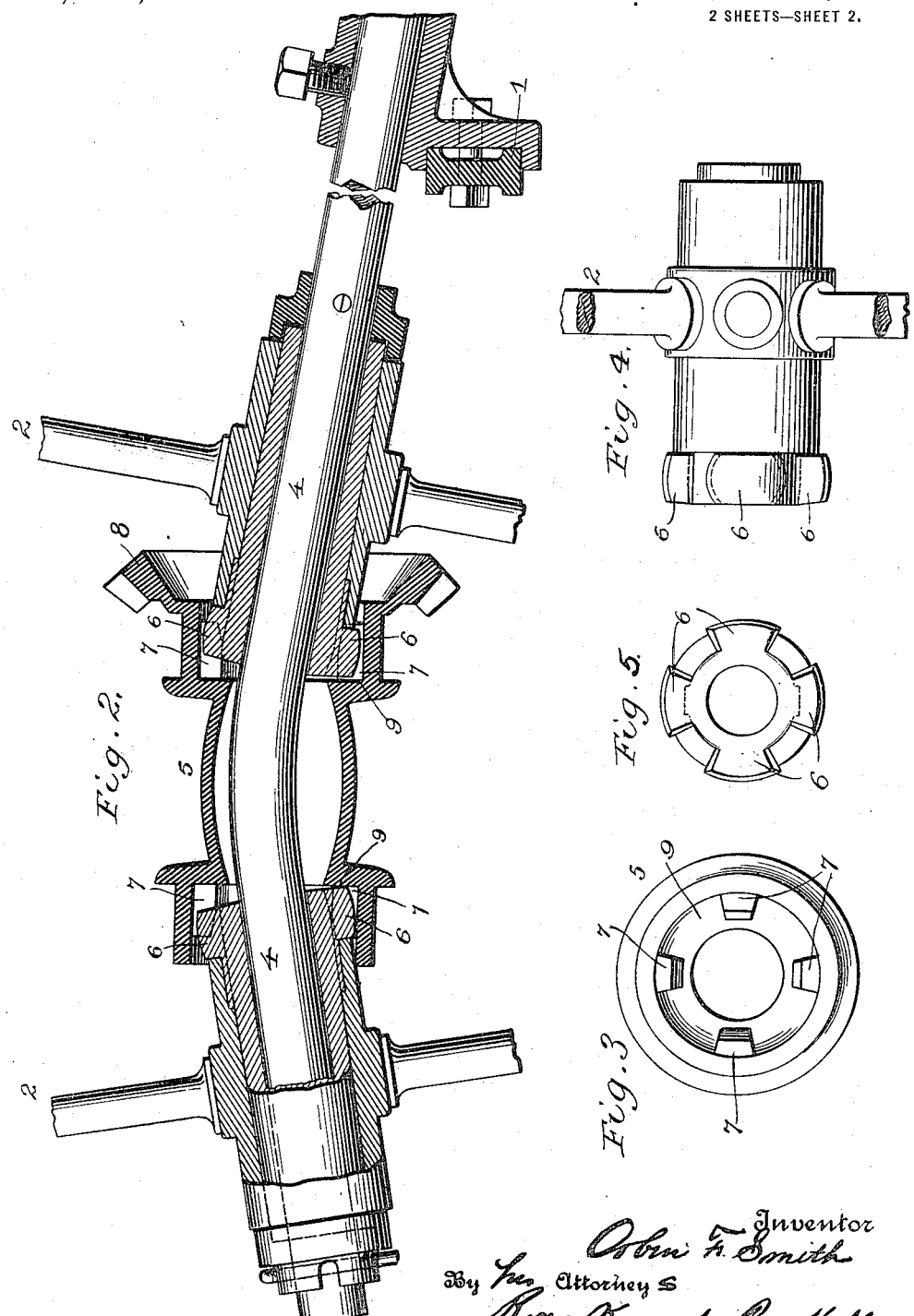

UNITED STATES PATENT OFFICE.

ORBIN F. SMITH, OF MOLINE, ILLINOIS, ASSIGNOR TO MOLINE PLOW COMPANY, A CORPORATION OF ILLINOIS.

SEEDING-MACHINE.

1,212,414.  Specification of Letters Patent.  Patented Jan. 16, 1917.

Original application filed June 2, 1915, Serial No. 31,644. Divided and this application filed October 15, 1915. Serial No. 55,960.

*To all whom it may concern:*

Be it known that I, ORBIN F. SMITH, a citizen of the United States, residing at Moline, in the county of Rock Island and State of Illinois, have invented certain new and useful Improvements in Seeding-Machines, of which the following is a specification, reference being had therein to the accompanying drawing, the same being a division of original application filed June 2, 1915, Serial No. 31,644.

This invention relates to seeding machines, more particularly for planting corn, and in which a frame equipped with seed discharging mechanism is sustained by two pairs of inwardly inclined supporting wheels which travel in rear of the deposited seed and which act to cover the same with soil.

My invention is directed more particularly to the mounting of the wheels in pairs, and the invention consists in a coupling member of improved form for the wheels of a pair, which member is adapted to coöperate with an improved form of the ends of the hubs of the wheels, in such manner that while the wheels will be free to rotate on relatively inclined axes to cause them to incline inwardly toward each other at their lower sides, the motion of one wheel in its travel over the ground will be transmitted to the other. As a result of this construction, both of the wheels of a pair will rotate in unison and uniformly without regard to irregularities in the surface of the ground, so that they will act effectively to cover the deposited seed. Furthermore, and by reason of the fact that the rotation of one wheel is transmitted to the other through the medium of the coupling sleeve, the latter will receive rotation from either wheel. This insures that the coupling sleeve will be rotated, although but one wheel of the pair may be for the time being in contact with the ground, and as a result of this action I am enabled to utilize the coupling sleeve for driving a gear for imparting motion from the ground wheels to the operative parts of the machine.

In the accompanying drawings: Figure 1 is a rear elevation of a corn planting machine having my invention embodied therein; Fig. 2 is a longitudinal section or elevation on an enlarged scale, through the hubs of a pair of ground wheels, their supporting stems, and the intermediate coupling sleeve; Fig. 3 is a view looking into one end of the coupling sleeve; Fig. 4 is a side elevation of one of the wheel hubs, showing the form and arrangement of the lugs through which driving connection is effected with the coupling sleeve; Fig. 5 is an end view of the same.

Referring to the drawings: 1 represents the frame of a corn planting machine supported by two pairs of ground and covering wheels 2, and giving support to seed discharging mechanisms 3 arranged in advance of the ground wheels and discharging into seed tubes 3$^a$, the wheels of each pair rotating on axes inclining outwardly and downwardly from each other, in order to give the wheels an inclined stagger so that in their rotation they will cover the deposited seed with soil as usual.

The individual wheels of a pair are mounted to rotate freely on wheel stems 4, 4 which extend outwardly and downwardly from each other in opposite directions from a point between the wheels, so that the stems are inclined relatively to each other, and the wheels mounted thereon converge toward their lower ends. In the present instance the stem for each set of wheels is in the form of a single axle bent upwardly between its ends to constitute the two relatively inclined wheel carrying portions, which axles are firmly fixed at their inner ends to the frame of the machine respectively at opposite sides of the latter, so as to support the two pairs of wheels respectively in rear of the two seed tubes.

5 represents a spacing sleeve for the wheels of a pair, which sleeve is of such form and construction, and coöperates with the wheel hubs in such manner that the wheels will be maintained in proper and uniformly spaced relations, while at the same time they will be compelled to rotate in unison, and the sleeve will receive a continuous and uniform rotary motion from the wheels, and this notwithstanding the fact that one of the wheels of a pair may at the moment be out of contact with the ground. This operation of the parts is of special advantage in the event that the sleeve carries a gear or sprocket for transmitting motion to some other part of the machine, the coupling of the wheels in driving engagement by the sleeve in accordance with my improved construction, insuring that the sleeve be rotated to perform its driving action by either or both of the wheels.

On reference to Fig. 2, it will be seen that the inner ends of the two hubs are formed at intervals therearound with driving lugs 6, leaving longitudinal spaces between them, which lugs are curved outwardly between their ends both at their outer surfaces and at their sides in a direction axially of the hub, the curve of the outer surface of the lugs being from a center co-incident with the axis of rotation of the hubs, the lugs thus shaped and formed constituting in effect a section of a sphere. Arranged between the adjacent ends of the hubs is the coupling sleeve 5 before alluded to, the ends of which surround the lugs on the hubs, and the sleeve being provided with inwardly extending projections 7 projecting between the lugs. As a result of this construction, universal joints are formed between the ends of the hubs and the coupling sleeve, the special form of the lugs enabling the hubs to fit closely within the ends of the sleeve, and permitting the wheels to rotate about axes inclined relatively to the axis of the coupling sleeve without binding or cramping. As a result, the sleeve, which is of considerable length, is given extended and firm support in the rotary motion imparted to it by the wheels, so that it is well adapted to impart motion to the operative parts of the machine through the medium of a gear 8 thereon, or by other and equivalent means. Adjacent its ends the sleeve is provided with inwardly extending annular flanges 9 against which the ends of the hubs are adapted to abut, and by which the end thrusts of the two wheels are effectively sustained and the proper spacing of the wheels maintained. It will be observed that the ends of the hubs slope outwardly from the center, and that the flanges 9 on the coupling sleeve are arranged in vertical planes. This arrangement of the parts provides for the abutting of the ends of the hub against said shoulders, notwithstanding the fact that the wheels rotate about inclined axes on the spindles 4.

In the accompanying drawing and foregoing description I have set forth my invention in the particular form and construction which I prefer to adopt and which in practice has been found to answer to a satisfactory degree the ends to be attained. It will be manifest, however, that various changes in the construction, such as would suggest themselves to the skilled mechanic, may be made without departing from the minutes of my invention; and further it will be understood that the invention is not limited to any particular form or construction of the parts except in so far as such limitations are specified in the claims.

Having thus described my invention, what I claim is:

1. In a seeding machine, the combination of two oppositely extending relatively inclined wheel spindles, wheels mounted to rotate on the respective spindles, the adjacent ends of the hubs of which wheels are provided with lugs having outer surfaces curved outwardly in an axial direction, and an intermediate coupling sleeve surrounding at its ends the lugs on the hubs, and provided with lugs extending between those on the hubs.

2. In a seeding machine, the combination of oppositely extending relatively inclined wheel spindles, ground wheels mounted to rotate on the respective spindles, the adjacent ends of the hubs of which wheels are provided with lugs whose outer surfaces are curved axially from a center coincident with the axis of rotation, and an intermediate coupling sleeve surrounding at its ends the lugs on the hubs, and being provided with lugs extending between those on the hubs.

3. In a seeding machine, the combination of two oppositely extending relatively inclined wheel spindles, ground wheels mounted to rotate thereon, the adjacent ends of the hubs of which wheels are provided with lugs constituting sections of a sphere, and an intermediate coupling sleeve surrounding at its ends the lugs on the hubs, and being provided with lugs extending between those on the hubs.

4. In a seeding machine, the combination of two oppositely extending relatively inclined wheel spindles, ground wheels mounted loosely thereon, the adjacent ends of the hubs of which wheels are provided with lugs curved outwardly at their sides and at their outer surfaces axially between their ends, and a coupling sleeve surrounding at its ends the lugs on the hubs, and provided with lugs extending between those on the hubs.

5. In a seeding machine, the combination of two oppositely extending relatively inclined wheel spindles, ground wheels mounted to rotate thereon, and an intermediate coupling sleeve, in the outer ends of which the adjacent ends of the hubs of said wheels extend, said sleeve being provided with inwardly extending annular shoulders against which the inner ends of the hubs are adapted to respectively abut.

6. In a seeding machine, the combination of two oppositely extending relatively inclined wheel spindles, ground wheels mounted to rotate thereon, and an intermediate coupling sleeve having a driving engagement with the respective wheel hubs, said sleeve being provided with a driving gear.

7. In a seeding machine, the combination of two oppositely extending wheel spindles inclined in opposite directions downwardly, ground wheels mounted to rotate on said spindles on relatively inclined axes, the hubs of said wheels having their inner ends sloping outwardly from the center, and an intermediate coupling sleeve with the outer ends of which the said hubs have interlocking driving engagement, said sleeve being provided with inwardly extending annular shoulders disposed in vertical planes against the lower portions of which shoulders the ends of the hubs are adapted to respectively abut.

In testimony whereof, I have affixed my signature.

ORBIN F. SMITH.

Copies of this patent may be obtained for five cents each, by addressing the "Commissioner of Patents, Washington, D. C."